(12) United States Patent
Yang

(10) Patent No.: US 12,007,887 B2
(45) Date of Patent: Jun. 11, 2024

(54) METHOD AND SYSTEM FOR GARBAGE COLLECTION

(71) Applicant: SK hynix Inc., Gyeonggi-do (KR)

(72) Inventor: Soon Yeal Yang, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 86 days.

(21) Appl. No.: 17/752,449

(22) Filed: May 24, 2022

(65) Prior Publication Data

US 2022/0382673 A1 Dec. 1, 2022

Related U.S. Application Data

(60) Provisional application No. 63/192,877, filed on May 25, 2021.

(30) Foreign Application Priority Data

Jun. 30, 2021 (KR) .................. 10-2021-0086013
Jul. 20, 2021 (KR) .................. 10-2021-0094981
May 17, 2022 (KR) .................. 10-2022-0060475

(51) Int. Cl.
*G06F 12/02* (2006.01)
*G06F 12/0864* (2016.01)
*G06F 12/0882* (2016.01)

(52) U.S. Cl.
CPC ...... *G06F 12/0253* (2013.01); *G06F 12/0864* (2013.01); *G06F 12/0882* (2013.01)

(58) Field of Classification Search
CPC ............. G06F 12/0253; G06F 12/0864; G06F 12/0882; G06F 3/061; G06F 3/064;
(Continued)

(56) References Cited

U.S. PATENT DOCUMENTS 9,489,296 B1* 11/2016 Tomlin ............... G06F 12/0253
2007/0011321 A1 1/2007 Huntington et al.
(Continued)

FOREIGN PATENT DOCUMENTS

KR 10-2018-0083093 A 7/2018
KR 10-2019-0141070 A 12/2019
(Continued)

OTHER PUBLICATIONS

Notice of Allowance for the U.S. Appl. No. 17/752,128 issued by the USPTO dated Jun. 5, 2023.
(Continued)

*Primary Examiner* — Khoa D Doan
(74) *Attorney, Agent, or Firm* — IP & T GROUP LLP

(57) ABSTRACT

A storage device may include a memory device including a plurality of memory dies; and a memory controller configured to control the memory device in units of super blocks each including two or more memory blocks included in the memory device, wherein at least one of the super blocks within the memory device is a super block including a plurality of small multi-die zones each including a portion of each of the memory blocks included in different memory dies among the memory dies, wherein the memory controller is further configured to receive a garbage collection request and information on valid pages included in the small multi-die zone, and to select, among the super blocks within the memory device, a victim super block in response to the garbage collection request and information on valid pages included in the small multi-die zone.

18 Claims, 14 Drawing Sheets

(58) Field of Classification Search
CPC .... G06F 3/0644; G06F 3/0652; G06F 3/0656; G06F 3/0658; G06F 3/0683
See application file for complete search history.

(56) References Cited

U.S. PATENT DOCUMENTS

| | | |
|---|---|---|
| 2010/0268876 A1 | 10/2010 | Reid et al. |
| 2016/0210066 A1 | 7/2016 | Yamaura et al. |
| 2018/0018091 A1* | 1/2018 | Shin .................... G06F 12/0246 |
| 2019/0087284 A1 | 3/2019 | Kim et al. |
| 2019/0129840 A1 | 5/2019 | Kanno |
| 2019/0129862 A1* | 5/2019 | Yoshida ................ G06F 3/0662 |
| 2019/0310774 A1 | 10/2019 | Oh et al. |
| 2020/0125292 A1* | 4/2020 | Byun .................... G06F 3/0673 |
| 2021/0216418 A1 | 7/2021 | Han et al. |
| 2022/0365710 A1 | 11/2022 | Golov |

FOREIGN PATENT DOCUMENTS

| | | |
|---|---|---|
| KR | 10-2020-0019653 A | 2/2020 |
| WO | 2016162981 A1 | 10/2016 |

OTHER PUBLICATIONS

Office Action for the U.S. Appl. No. 17/752,147 issued by the USPTO dated Jun. 6, 2023.
Notice of Allowance for the U.S. Appl. No. 17/752,147 issued by the USPTO dated Dec. 4, 2023.

* cited by examiner

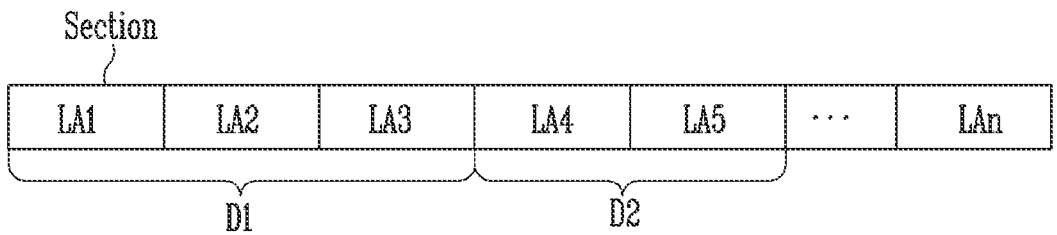

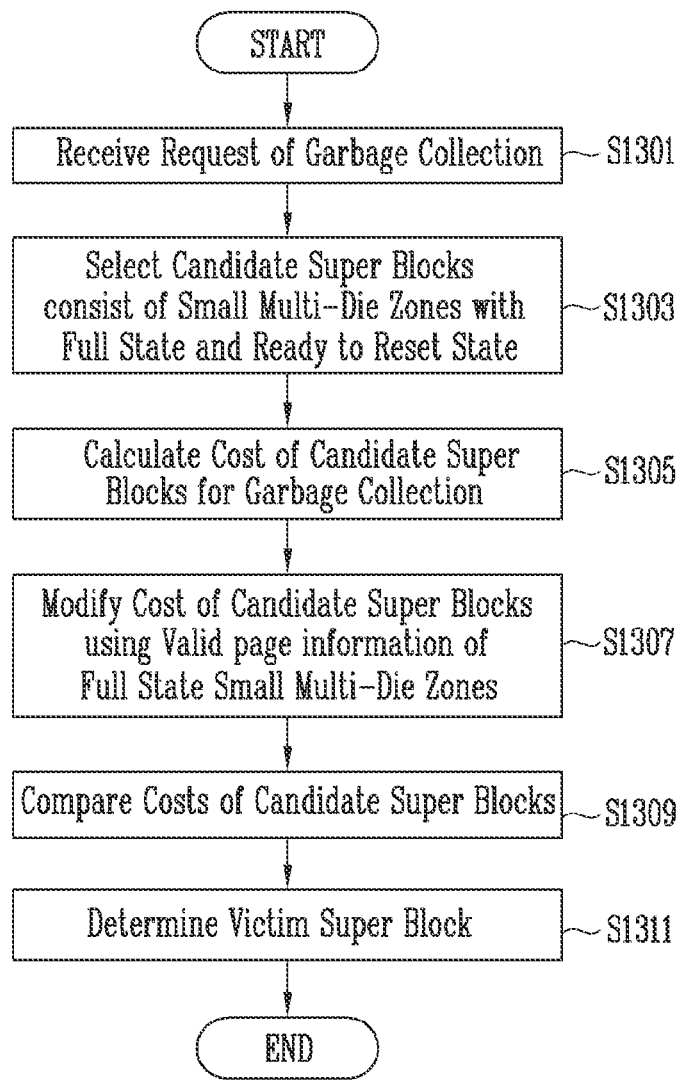

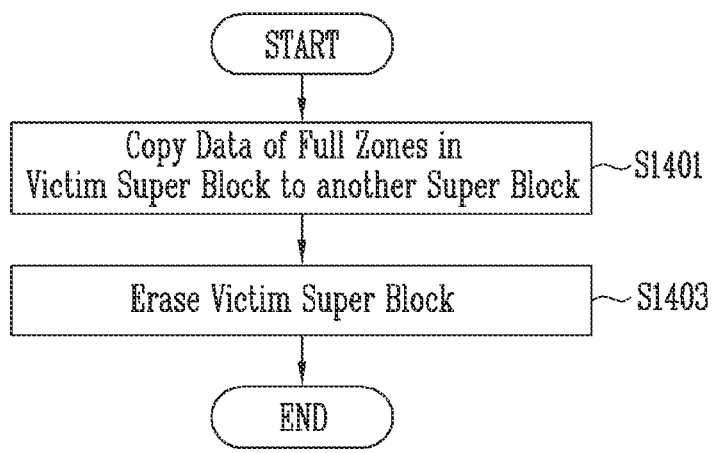
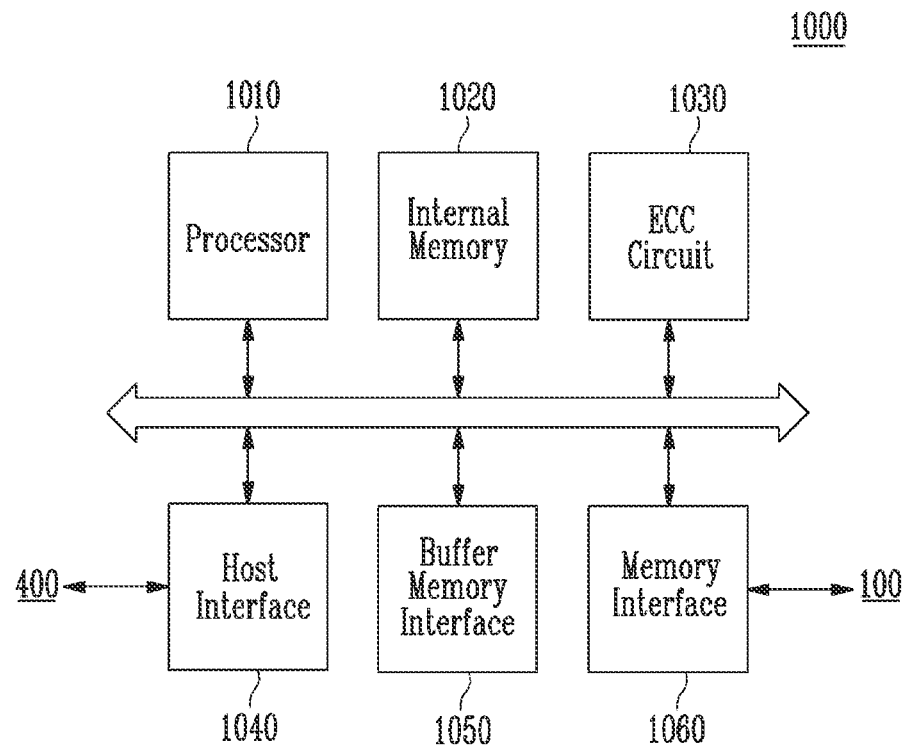

METHOD AND SYSTEM FOR GARBAGE COLLECTION

CROSS-REFERENCE TO RELATED APPLICATION

The present application claims benefit under 35 U.S.C. § 119(e) of U.S. Provisional Application No. 63/192,877, filed on May 25, 2021, Korean patent application number 10-2021-0094981, filed on Jul. 20, 2021, Korean patent application number 10-2021-0086013, filed on Jun. 30, 2021 and Korean patent application number 10-2022-0060475, filed on May 17, 2022, the entire disclosures of which are incorporated by reference herein.

BACKGROUND

1. Field of Invention

The present disclosure relates to an electronic device, and more particularly, to a storage device and a method of operating the same.

2. Description of Related Art

A storage device converts a logical address received from a host into a physical address and uses the physical address, thus a logical area in the host and a physical area of the storage device are related to each other. Accordingly, in order to improve performance of an electronic device, a new device or method capable of controlling the host and the storage device is required.

SUMMARY

An embodiment of the present disclosure provides a storage device and a method of operating the same capable of efficient management for each characteristic of data.

According to an embodiment of the present disclosure, a storage device may include a memory device including a plurality of memory dies; and a memory controller configured to control the memory device in units of super blocks each including two or more memory blocks included in the memory device, wherein at least one of the super blocks within the memory device is a super block including a plurality of small multi-die zones each including a portion of each of the memory blocks included in different memory dies among the memory dies, wherein the memory controller is further configured to receive a garbage collection request and information on valid pages included in the small multi-die zone, and to select, among the super blocks within the memory device, a victim super block in response to the garbage collection request and information on valid pages included in the small multi-die zone.

According to an embodiment of the present disclosure, a method of operating a storage device, which includes a memory device including a plurality of memory dies and a memory controller controlling the memory device in units of super blocks each including two or more memory blocks included in the memory device, may include receiving a garbage collection request and information on valid pages; and selecting, among the super blocks within the memory device, a victim super block based on the information on valid pages, wherein at least one of the super blocks within the memory device is a super block including a plurality of small multi-die zones each including a portion of each of the memory blocks included in different memory dies among the memory dies, and wherein the valid pages are included in the small multi-die zone.

According to an embodiment of the present disclosure, an operating method of a controller, the operating method may comprise: selecting, in response to a request provided together with information, a victim group of zones each configured by one or more pages partly included in each memory block in each plane in each die within a memory device; and controlling the memory device to perform a garbage collection operation on the victim group, wherein each of the zones within the victim group is a first zone in a ready-to-reset state or a second zone in a full state, and wherein the selecting includes: calculating each cost of groups each including the first and second zones in the memory device according to a first number of the first zones included in each of the groups; lowering the cost as a second number of valid pages becomes greater within the second zones included in a corresponding one of the groups, the second number being included in the information; and selecting the victim group of at least one among the costs of the groups.

The present technology provides a storage device and a method of operating the same capable of efficient management for each characteristic of data.

BRIEF DESCRIPTION OF THE DRAWINGS

FIG. 6 is a diagram illustrating a structure of a section allocated by a file system according to an embodiment of the present disclosure.

FIG. 7 is a diagram illustrating a process of allocating a new section of a first section group by the file system according to an embodiment of the present disclosure.

FIGS. 8 and 9 are diagrams illustrating a process of allocating a new section of a second section group by the file system according to an embodiment of the present disclosure.

FIG. 13 a flowchart illustrating a process of selecting a victim super block in a storage device according to an embodiment of the present disclosure.

FIG. 14 is a flowchart illustrating a process of performing garbage collection on a victim super block according to an embodiment of the present disclosure.

FIG. 15 is a diagram illustrating a memory controller of FIG. 1 according to another embodiment of the present disclosure.

DETAILED DESCRIPTION

Specific structural or functional descriptions of embodiments according to the concept which is disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
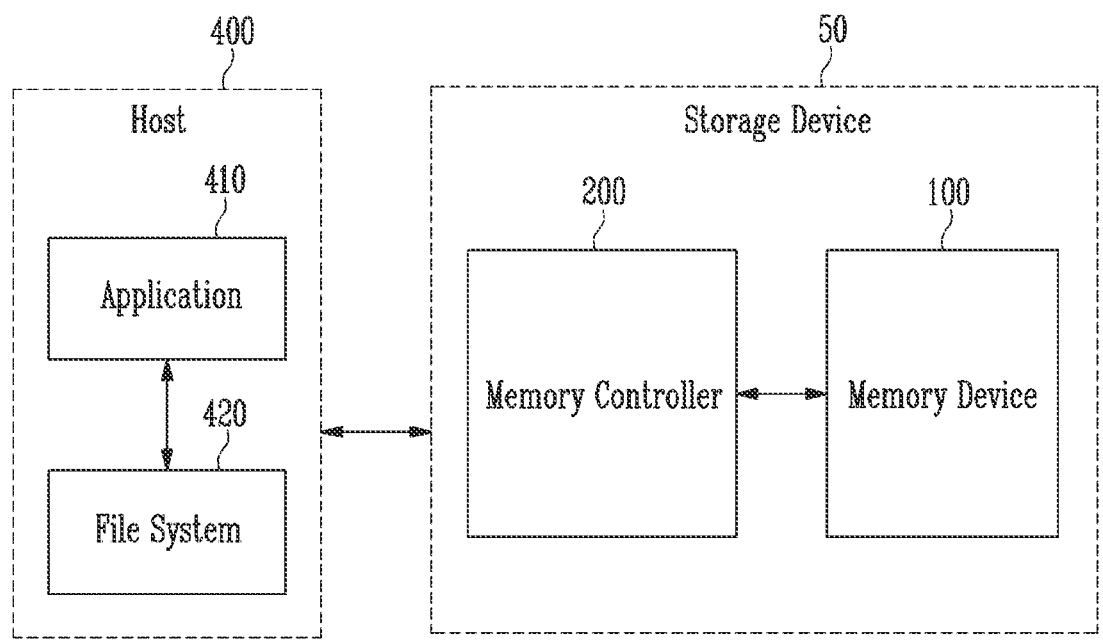
FIG. 1 is a diagram illustrating a storage device according to an embodiment of the present disclosure.

FIG. 1 is a diagram illustrating an electronic device according to an embodiment of the present disclosure.

Referring to FIG. 1, the storage device 50 may include a memory device 100 and a memory controller 200. The storage device 50 may be a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under control of the host 400 that stores high-capacity data in one place, such as a server or a data center.

The storage device 50 may be manufactured as one of various types of storage devices according to a host interface that is a communication method with the host 400. For example, the storage device 50 may be configured as one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array (not shown) may include a plurality of memory blocks. Each memory block may include a plurality of memory cells. Each memory block may include a plurality of pages. In an embodiment, the page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change RAM (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control an overall operation of the storage device 50.

In an embodiment, the memory controller 200 may receive data and a logical address (LA) from the host 400, and the memory controller 200 may include a firmware (not shown) capable of converting the LA into a physical address (PA) indicating an address of memory cells to which data included in the memory device 100 is to be stored. In addition, the memory controller 200 may store a logical-physical address mapping table configuring a mapping relationship between the LA and the PA in a buffer memory.

The memory controller 200 may control the memory device 100 to perform the program operation, the read operation, or the erase operation according to a request of the host 400. During the program operation, the memory controller 200 may provide a program command, the PA, and data to the memory device 100. During the read operation, the memory controller 200 may provide a read command and the PA to the memory device 100. During the erase operation, the memory controller 200 may provide an erase command and the PA to the memory device 100.

Alternatively, the memory controller 200 may open or close a zone in the memory device 100 according to a request of the host 400. Opening the zone may be generating a map table for a logical address group corresponding to a corresponding zone, for example, LAs corresponding to a section allocated with respect to data by the host. Closing the zone may indicate that a write request storing data in a corresponding zone does not exist until an open request is received again with respect to the zone. The host 400 may provide a request to open or close such a zone as a separate request, or may provide the request together with another request such as a write request.

In an embodiment, the memory controller 200 may generate a command, an address, and data independently regardless of the request from the host 400 and transmit the command, the address, and the data to the memory device 100. For example, the memory controller 200 may provide the command, the address, and the data for performing the program operation, the read operation, and the erase operation accompanying in performing wear leveling, read reclaim, garbage collection, and the like, to the memory device 100.

In an embodiment, the memory controller 200 may include a flash translation layer. The flash translation layer may convert the LA corresponding to the request received from the host 400 into the physical address PA and output the PA to the memory device 100.

For example, as described above, the flash translation layer may convert an LA corresponding to a program request into the PA, or convert an LA corresponding to a read request into the PA, or convert an LA corresponding to an erase request into the PA. The flash translation layer may output the converted PA to the memory device 100, and the memory device 100 may perform an operation on a page or a memory block corresponding to the PA.

In an embodiment, the memory controller 200 may receive LAs from a file system 420 and convert the received LAs into successive PAs. When the successive PAs are output to the memory device 100, the memory device 100 may perform successive operations corresponding to the successive PAs. At this time, the successive PAs may be determined according to a type of an allocated zone. The type of the zone is described in more detail with reference to FIGS. 4, 5, and the like.

In an embodiment, the storage device 50 may further include the buffer memory (not shown). The memory controller 200 may control data exchange between the host 400 and the buffer memory (not shown). Alternatively, the memory controller 200 may temporarily store system data for control of the memory device 100 in the buffer memory. For example, the memory controller 200 may temporarily store data input from the host 400 in the buffer memory, and then transmit the data temporarily stored in the buffer memory to the memory device 100.

In various embodiments, the buffer memory may be used as an operation memory and a cache memory of the memory controller 200. The buffer memory may store codes or commands executed by the memory controller 200. Alternatively, the buffer memory may store data processed by the memory controller 200.

In an embodiment, the buffer memory may be implemented as a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR) or a Rambus dynamic random access memory (RDRAM), or a static random access memory (SRAM).

In various embodiments, the buffer memory may be connected from an outside of the storage device 50. In this case, volatile memory devices connected to the outside of the storage device 50 may serve as buffer memories.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other. Alternatively, the interleaving method may be a method of controlling operations on a plurality of groups divided within one memory device 100 to overlap. At this time, a group may be one or more memory die units or one or more memory plane units.

The host 400 may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In an embodiment, the host 400 may include an application 410. The application 410 may be also referred to as an application program, and may be software executed on an operating system (OS). The application 410 may process data in response to a user input. For example, the application 410 may process data in response to the user input, and transmit a request for storing the processed data in the memory device 100 of the storage device 50 to the file system 420.

The file system 420 may allocate an LA to which data is to be stored, in response to the request transmitted from the application. In an embodiment, the file system 420 may be a log structure file system (LFS). The LFS may generate a log in consideration of a property of input data, and allocate a section corresponding to data based on the log. At this time, the section may be a set of LAs. Therefore, allocation of the section may mean that LAs corresponding to corresponding data are allocated. The data to which the section is allocated may be sequentially stored in a storage area of the memory device 100 corresponding to the section. For example, the LFS may be a flash friendly file system (F2FS). The F2FS may be a log-based file system designed in consideration of a characteristic of a solid state drive (SSD), and may increase an internal parallelism of the SSD by using a multi-head log. Different sections may be allocated to data for which different logs are generated. The LFS may not overwrite data. When the LFS corrects data, the LFS may newly allocate an LA corresponding to data to be corrected and write the data to a physical zone corresponding thereto.

Data requested to be written by the application 410 nay be stored in a host memory (not shown) in the host, and may be flushed to the storage device 50 according to a request from the application by a device interface (not shown). The host memory may include volatile memories such as a DRAM, an SDRAM, a DDR SDRAM, an LPDDR SDRAM, and a GRAM or nonvolatile memories such as an FRAM, a ReRAM, an STT-MRAM, and a PRAM.

Figure 2:
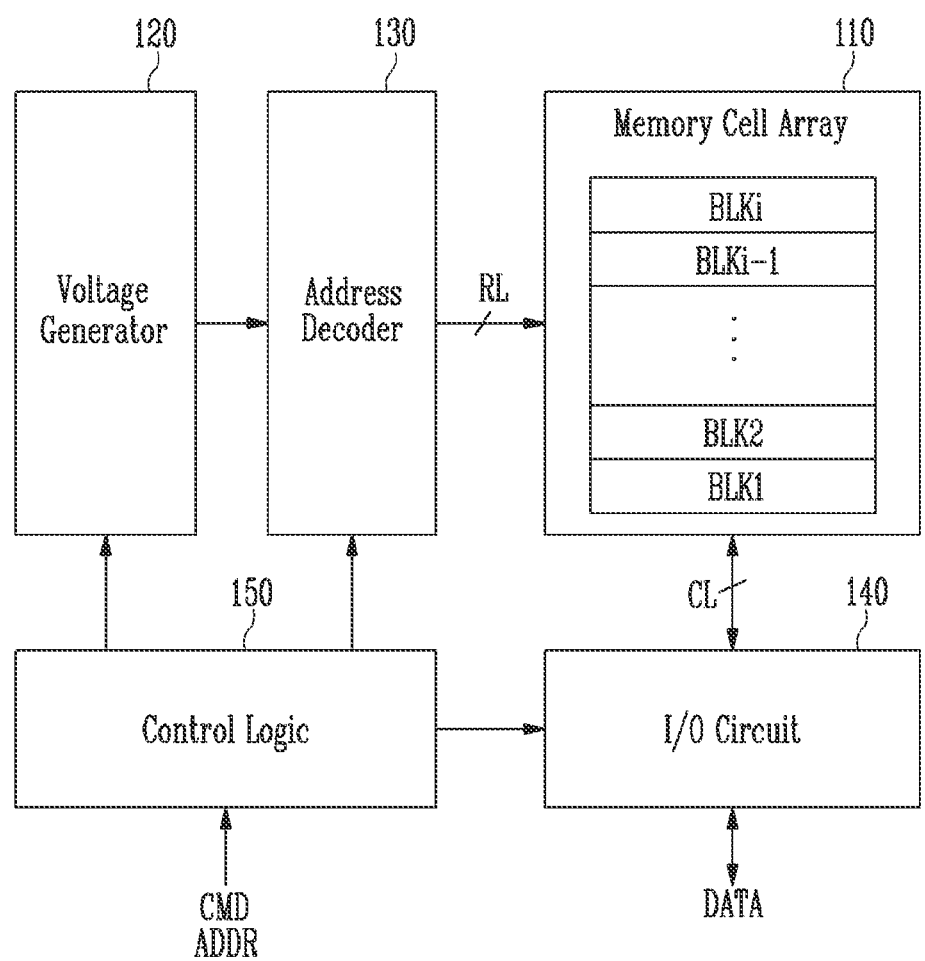
FIG. 2 is a diagram illustrating a memory device of FIG. 1 according to an embodiment of the present disclosure.

FIG. 2 is a diagram illustrating the memory device of FIG. 1 according to an embodiment of the present disclosure.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

In an embodiment, the memory cell array 110 may include one or more memory dies, and each memory die may include one or more planes including one or more memory blocks.

In addition, the plurality of memory blocks BLK included in the memory cell array 110 may be grouped into two or more super blocks (SBs). The SB may be a unit in which the control logic 150 manages the plurality of memory blocks BLK included in the memory cell array 110. One SB may be a set of memory blocks BLK on which the read operation, the write operation, and/or the like are/is performed simultaneously or in the same time period, the read operation, the write operation, and/or the like are/is performed in conjunction with or in relation to each other, a set of memory blocks BLK on which the read operation, the write operation, and/or the like are/is performed with respect to one command, or a set of memory blocks BLK on which the read operation, the write operation, and/or the like are/is performed in conjunction with each other or simultaneously. In addition, a group of memory blocks BLK distinguished from each other in terms of management or an operation among the plurality of memory blocks BLK may be referred to as the SB. All sizes of each of two or more SBs may be the same. That is, all numbers of memory blocks BLK included in each of the two or more SBs may be the same. Alternatively, a size of at least one of the two or more SBs may be different from that of the remaining SB. That is, the number of memory blocks BLK included in at least one SB among the plurality of SBs may be different from the number of memory blocks BLK included in the remaining SB. In addition, all of the two or more memory blocks BLK included in each of the two or more SBs may be positioned in the same memory die. Alternatively, the two or more memory blocks BLK included in each of the two or more SBs may be positioned in two or more different memory dies.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages using an external power voltage supplied to the memory device 100. The voltage generator 120 operates in response to the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors m response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
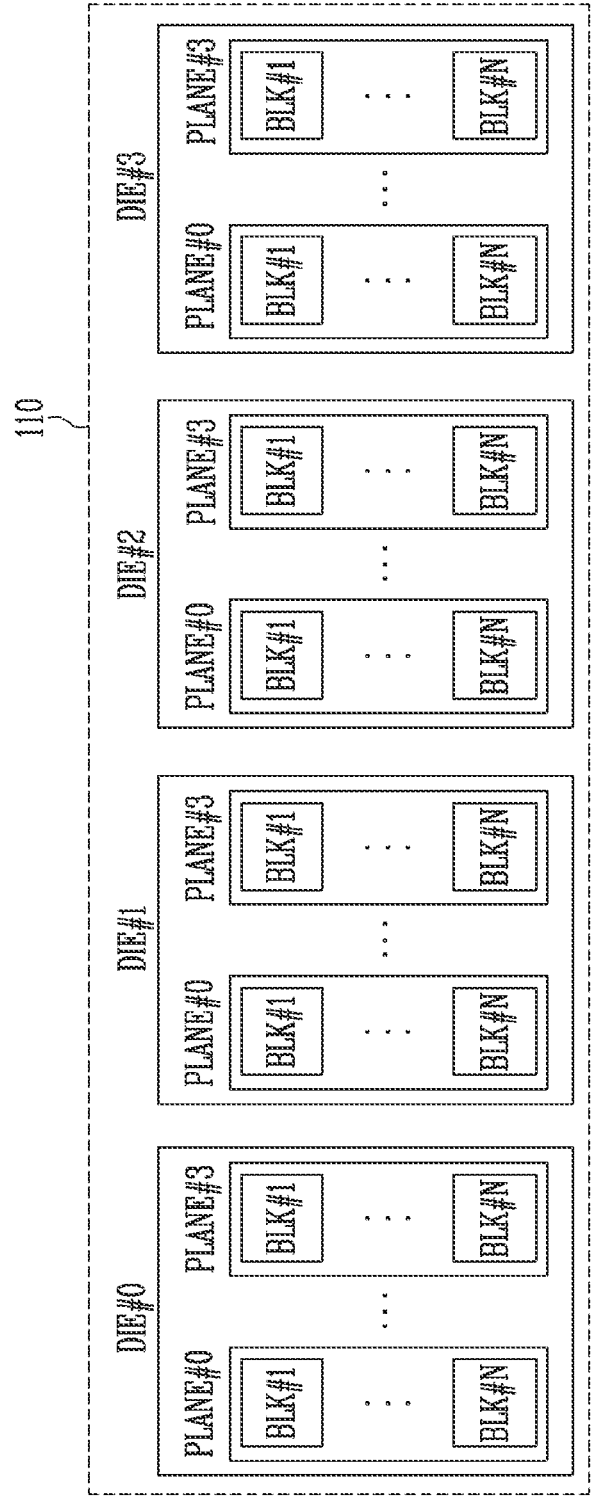
FIG. 3 is a diagram illustrating a memory cell array of FIG. 2 according to an embodiment of the present disclosure.

FIG. 3 is a diagram illustrating the memory cell array of FIG. 2 according to an embodiment of the present disclosure.

Referring to FIG. 3, the memory cell array 110 may include one or more memory dies, and each memory die may include one or more planes including one or more memory blocks. In FIG. 3, the memory cell array 110 includes four memory dies DIE #0, DIE #1, DIE #2, and DIE #3, but the number of memory dies is not limited thereto. The plurality of memory dies may perform transmission and reception with the memory controller through a plurality of channels, and each channel may be connected to one or more memory dies. For example, when one channel is connected to one memory die, one memory die may receive one command at a time, and the planes included in one memory die may process commands received by the memory die in parallel.

Figure 4:
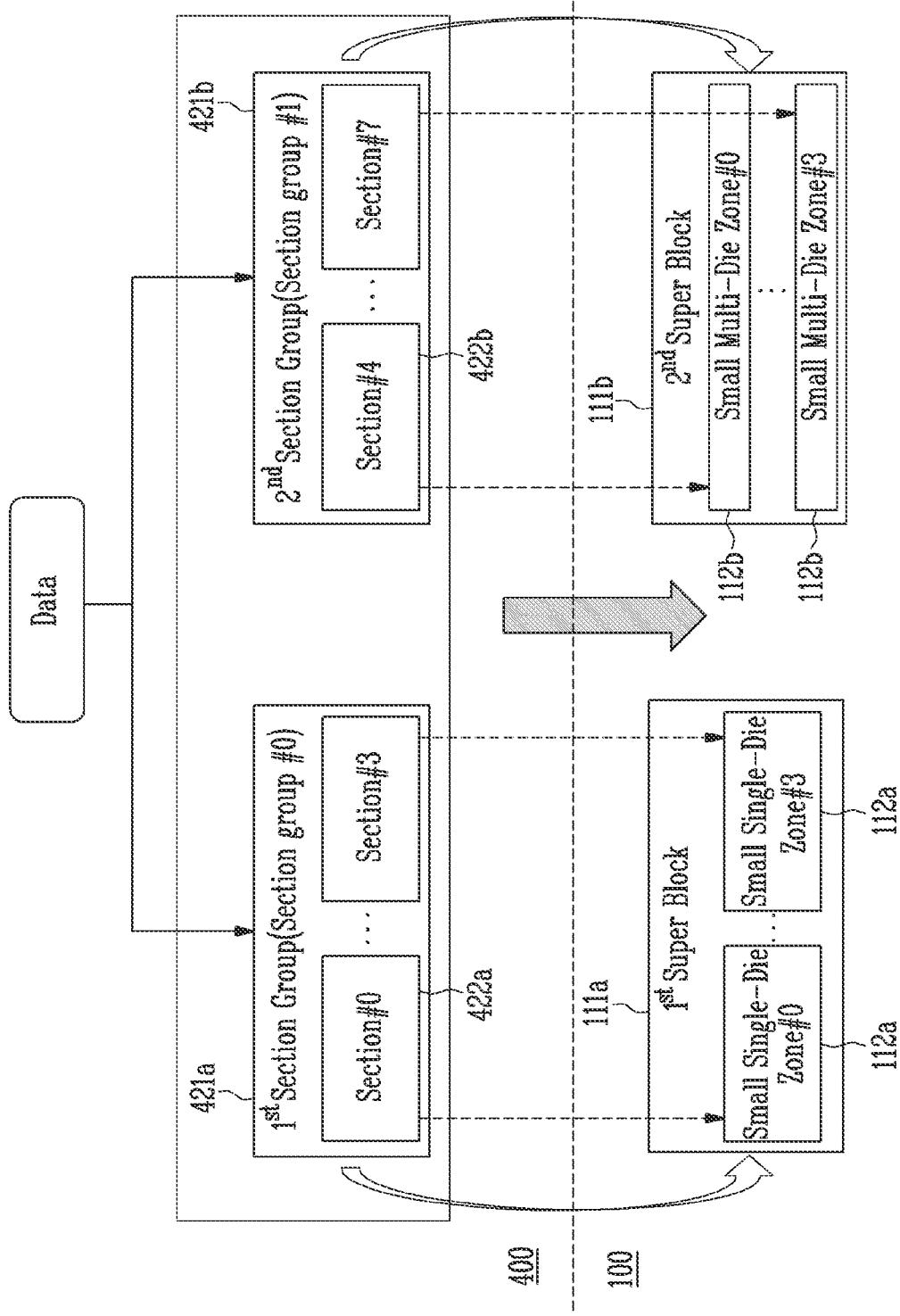
FIG. 4 is a diagram illustrating a super block allocation process of a storage device according to an embodiment of the present disclosure.

FIG. 4 is a diagram illustrating a super block allocation process of a storage device according to an embodiment of the present disclosure.

Referring to FIGS. 1 and 4, the file system 420 of the host 400 generates the log based on a property of data with respect to the data requested to be written by the application 410, classifies the data based on the log, and determines a section group including the section to be allocated to the data. According to various criteria, the data may be divided into first type data to which a first section 422a of a first section group 421a is allocated and second type data to which a second section 422b of a second section group 421b is allocated. The data to which the first section 422a in the first section group 421a is allocated by the file system may be stored in a small single-die zone 112a in a first SB 111a of the memory device 100 under the control of the memory controller 200 and the data to which the second section 422b in the second section group 421b is allocated may be stored in a small multi-die zone 112b in a second SB 111b of the memory device 100. The first section group 421a may correspond to the first SB 111a, and thus the first section 422a corresponds to the small single-die zone 112a. A characteristic of the first section 422a to which a new section may be allocated regardless of a section order in the section group corresponds to a characteristic of the small single-die zone 112a managed for each memory die, and both of the first section 422a and the small single-die zone 112a have the same characteristics that a reset or erase operation is possible in one section or zone unit. In addition, a characteristic of the second section 422b allocating a new section according to the section order in the section group corresponds to a characteristic of the small multi-die zone 112b formed over the plurality of memory dies, and both of the second section 422b and the small multi-die zone 112b have the same characteristics that the reset or erase operation is impossible in one section or zone unit, and the reset or erase operation is performed in a section group or SB unit after both of the second section group 421b and the second SB 111b to which each belongs are in a state in which both of the second section group 421b and the second SB 111b may be reset or erased. The allocation and reset of the first section 422a and the second section 422b are described in more detail with reference to FIGS. 6 to 11, and a shape of the small single-die zone 112a and the small multi-die zone 112b is described in more detail with reference to FIG. 5.

The first sections 422a in the first section group 421a may be allocated regardless of the section order, and the memory controller 200 may allocate the small single-die zone 112a formed as an area in one memory die in response to a request for allocating a zone in which data to which the section is allocated is to be stored from the host 400. The second sections 422b in the second section group 422b may be allocated according to the section order, and the memory controller 200 may allocate the small multi-die zone 112b formed as an area including some of the memory blocks in the plurality of memory dies in response to the request for allocating the zone in which the data to which the section is allocated is to be stored from the host 400. When the memory controller 200 replies with information that an additional allocable zone does not exist in a currently used SB with respect to the zone allocation request of the host 400, the file system 420 may allocate a new section group, and then allocate a section in the new section group. In response to this, the memory controller 200 may allocate a new SB and a new zone included therein, then store data to which the new section is allocated. Alternatively, the file system 420 may allocate the new section group and the section included therein by itself without receiving a reply information on the SB and the zone from the memory controller 200.

Figure 5:
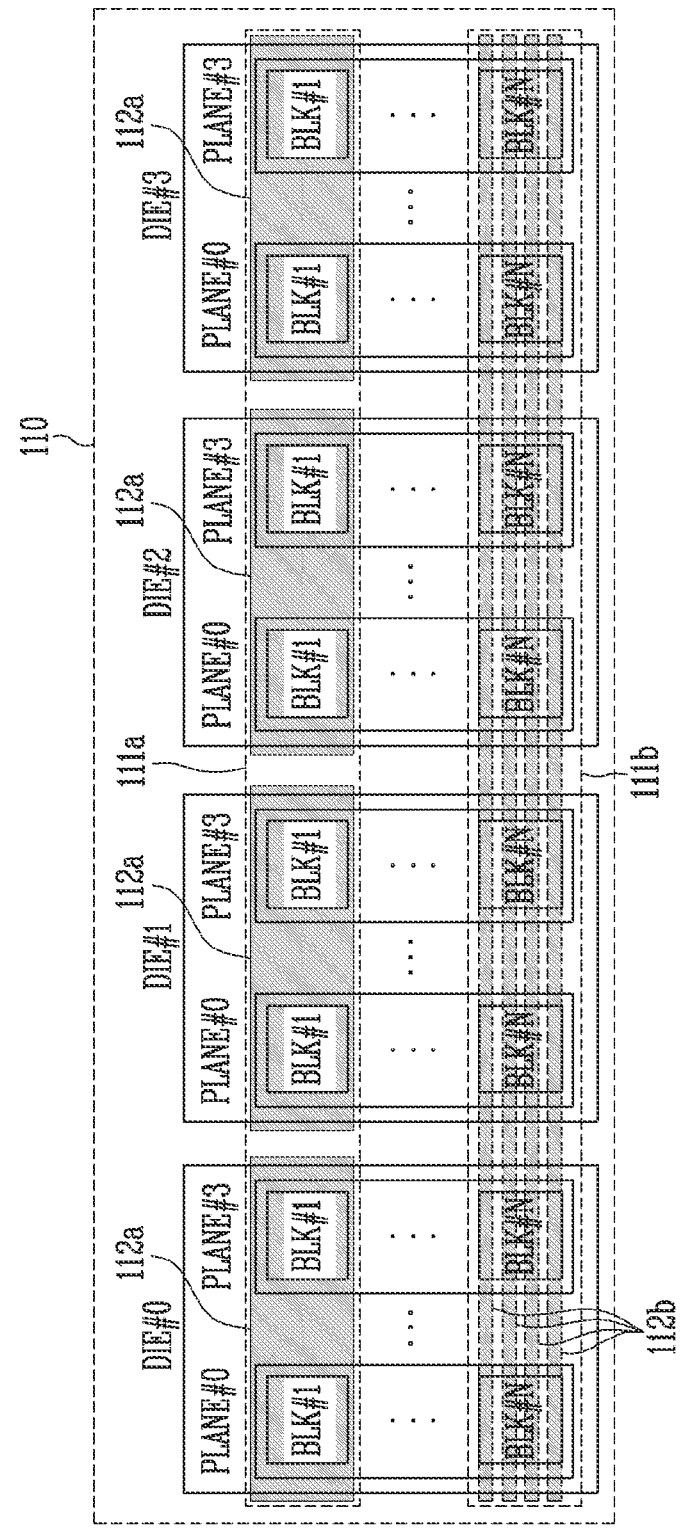
FIG. 5 is a diagram illustrating super block management of a storage device according to an embodiment of the present disclosure.

FIG. 5 is a diagram illustrating super block management of a storage device according to an embodiment of the present disclosure.

Referring to FIGS. 1, 4, and 5, the memory cell array 110 may include a plurality of memory dies, for example, four memory dies DIE #0 to DIE #3. In addition, each memory die may include a plurality of planes each including a plurality of memory blocks, for example, four planes PLANE #0 to PLANE #3. The memory controller 200 may control the memory cell array 110 of the memory device 100 by dividing the memory cell array 110 into a plurality of SBs. The SBs may include two or more memory blocks included in the memory cell array 110. The SBs may include a plurality of zones. The SB may be formed over the plurality of memory dies, and as shown in FIG. 5, the SB may be formed over all memory dies. The SB may be classified into the first SB 111a and the second SB 111b according to a type of the zone included therein. In the storage device according to an embodiment of the present disclosure, the SB, which is a unit by which the memory controller 200 controls the memory device 100, may include only the second SBs 111b including the small multi-die zones 112b, or may include both of the second SBs 111b including the small multi-die zones 112b and the first SBs 111a including the small single-die zones 112a.

In a case of the small single-die zone 112a included in the first SB 111a, one or more blocks may be included in one memory die. For example, as shown in FIG. 5, a zone including one memory block included in the planes 0 to 3 for each memory die may be designated as one zone, and thus the first SB 111a may include four small single-die zones 112a formed one by one for each memory die.

The small multi-die zone 112b included in the second SB 111b may include a portion of each of blocks included in different memory dies. For example, as shown in FIG. 5, the small multi-die zone 112b may be formed over the entire four memory dies DIE #0 to DIE #3, and may include only a portion of each of the memory blocks included in each plane. For example, as shown in FIG. 5, only ¼ of pages of each of the memory blocks included in each plane may be included. Accordingly, the second SB 111b may include four small multi-die zones 112b formed over all memory dies and formed to include only a partial page of each of the memory block.

In an embodiment, sizes of the first SB 111a and the second SB 111b may be the same. That is, the first SB 111a and the second SB 111b may include the same number of memory blocks. In addition, sizes of the small single-die zone 112a and the small multi-die zone 112b may be the same. That is, the number of pages included in the small single-die zone 112a and the small multi-die zone 112b may be the same. The small single-die zone 112a may be formed in one memory die. In contrast, the small multi-die zone 112b may be formed over the plurality of memory dies. Accordingly, the small multi-die zone 112b may be operated in a die interleaving method. In particular, when the small multi-die zone 112b is formed over all memory dies as shown in FIG. 5, the small mufti-die zone 112b may be operated in a full-die interleaving method. However, different small multi-die zones 112b may not be allocated and programmed simultaneously. In addition, since the small multi-die zone includes only a portion of each of the memory blocks, when a specific zone is to be erased, the specific zone may not be immediately erased, and when the entire page of each of the memory blocks partially included in a corresponding zone may be erased, that is, when the entire zone of the SB in which the corresponding zone is included may be erased, the corresponding zone may be erased. Therefore, the small multi-die zone may have an advantage that the small multi-die z one may be operated in the interleaving method of a memory die unit and the small multi-die zone may be unsuitable for storing data of which an input/output frequency is high in consideration of a limitation during program or erasure. Accordingly, when both of the first SB and the second SB are used, data having a relatively small capacity or a high input/output frequency may be stored in the small single-die zone in the first SB, and data having a relatively large capacity or a low input/output frequency may be stored in the small multi-die zone in the second SB, thereby resulting in performance improvement of the storage device.

The zone, which means physical zones included in the SB, such as the small single-die zone or the small multi-die zone, may be divided into a full state, an empty state, and an active state. The full state may mean a state in which data is stored in all areas in the zone and an empty area does not exist in the zone. The empty state may mean a state in which the zone is empty without data stored in an area in the zone. The active state may mean a state in which data is stored only in a partial area in the zone, and may be an open state or a closed state. The open state may mean a zone in which data is currently programmed among zones in which data is stored only in a partial area in the zone, and the closed state may mean a zone in which data is not currently programmed among the zones in which data is stored in a partial area in the zone.

In addition, the small multi-die zone may further have a ready-to-reset state. The reset operation on the zone may mean an operation for creating an empty zone by erasing the zone. The erasure may be performed in a memory block unit, and as shown in FIG. 5, the small multi-die zone 112*b* includes only a portion of each of the plurality of memory blocks. On the other hand, the small single-die zone 112*a* may include all of one or more memory blocks. Therefore, when a specific small single-die zone 112*a* is to be reset, a corresponding zone may be immediately erased. On the other hand, in a case where a specific small multi-die zone 112*b* is to be reset, when all pages of each of the memory blocks partially included in the corresponding zone may be erased, that is, when the entire zone of the SB in which the corresponding zone is included may be erased, the corresponding zone may be erased. Therefore, when the reset operation is performed on the small multi-die zone 112*b*, the corresponding zone may not be immediately erased, and may be switched to the ready-to-reset state. When all small multi-die zones 112*b* in the second SB 111*b* in which the small multi-die zone 112*b* is included are switched to the ready-to-reset state, all small multi-die zones 112*b* in the corresponding SB may be erased at once, and may be switched to the empty state.

FIG. 6 is a diagram illustrating a structure of the section allocated by the file system according to an embodiment of the present disclosure.

Referring to FIG. 6, the section may include a plurality of LAs. The LAs included in one section may be successive addresses or non-successive addresses. Allocation of the section to data may mean that the LA in the section is allocated. Information on the addresses included in each section may be included in the memory in the host or the memory in the storage device. The LA may be sequentially allocated according to a size of data of which writing is requested. For example, when a write request for data D1 and D2 of a specific size exists, and the sections of FIG. 5 are allocated to both of the data D1 and D2, LAs of LA1 to LA3 may be allocated to D1, and LAs of LA4 and LA5 may be allocated to D2.

FIG. 7 is a diagram illustrating a process of allocating a new section of the first section group by the file system according to an embodiment of the present disclosure.

Referring to FIG. 7, a section group to which a new section may be allocated regardless of the section order in the section group may be defined as the first section group 421*a*. At this time, LAs included in the sections in the section group may be successive with each other, and as the number of section in the section group increases, the LA may increase. Therefore, the section order may mean a section number order in the section group, which may mean an order in a direction in which the LA increases. Alternatively, the LAs included in the sections in the section group may not be successive with each other. In this case, the section order may be determined based on information on a section stored in a separate memory and LAs included for each section group. In a case of the first section group 421*a*, since the section is allocated and the LA may be allocated regardless of the section order, a third section Section #3 may be allocated first and all LAs in the third section may be assigned. Therefore, after a full section, a first section Section #1 may be allocated and the LA for new data may be allocated. When all LAs of the first section, which are open sections, are assigned to the data and the first section becomes the full section, the file system 420 may allocate one of a 0-th section Section #0 or a second sections Section #2 which is an empty section as a new section and assign an LA included therein to the data.

Figure 9:
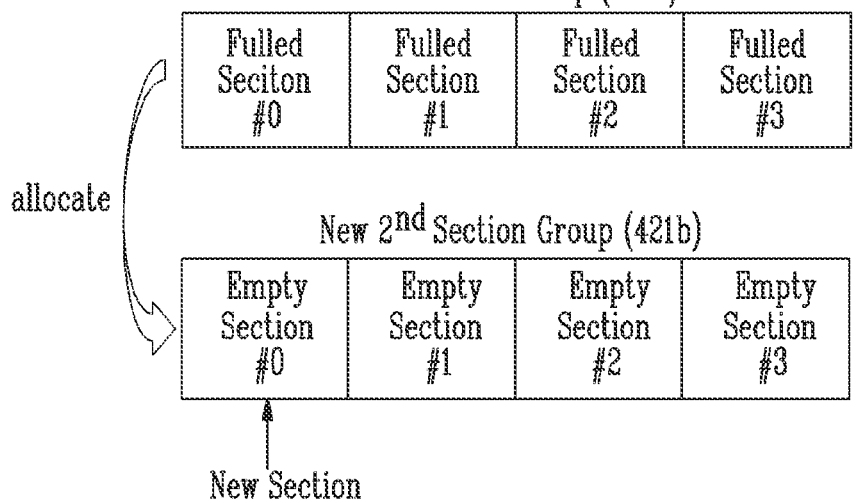

FIGS. 8 and 9 are diagrams illustrating a process of allocating a new section of a second section group by the file system according to an embodiment of the present disclosure.

Referring to FIGS. 8 and 9, a section group to which a new section may be allocated according to the section order in the section group may be defined as the second section group 421*b*. As shown in FIG. 8, in the second section group, the 0-th section Section #0 may be opened first and an LA included therein may be assigned to the data, when the 0-th section becomes the full section, a first section Section #1 which is a next section may be allocated as a new section, and thus data may be stored. When all sections in the second section group 421*b* are the full sections as shown in FIG. 7B after the file system 420 allocates the new second section group 421*b*, the file system 420 may allocate the 0-th section Section #0 which is a first section in the new second section group 421*b* and assign an LA included therein to the data. At this time, in a case of the second section 421*b*, since the section is allocated according to the section order in the section group, and when the third section Section #3 which is a last section is the full section, the empty section may not exist among sections prior thereto. Therefore, in a case of the second section group 421*b*, the empty section in the section group is required to be found, and when a section of a next section in the second section group 421*b* does not exist, the file system 420 allocates a new second section group 421*b*.

Figure 10:
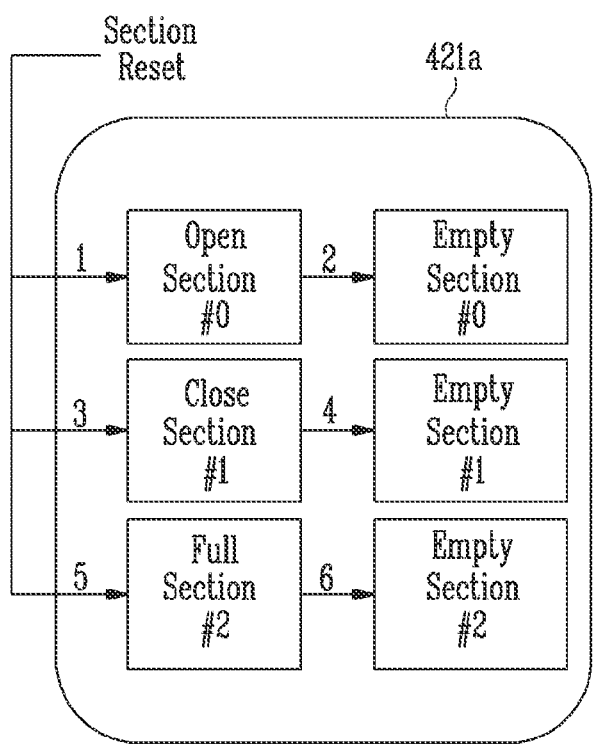
FIG. 10 is a diagram illustrating a reset process of the first section group by the file system according to an embodiment of the present disclosure.

FIG. 10 is a diagram illustrating a reset process of the first section group by the file system according to an embodiment of the present disclosure.

Referring to FIG. 10, in the first section group 421a, 1) when resetting the 0-th section Section #0, 2) as all data corresponding to the LAs in the 0-th section are discarded, the 0-th section may become the empty section, and thus a reset operation is completed. In addition, 3) when resetting the first section Section #1, 4) as all data corresponding to the LAs in the first section are discarded, the first section may become the empty section, and thus the reset operation may be completed. In addition, 5) when resetting the second section Section #2, 6) as all data corresponding to the LAs in the second section are discarded, the second section may become the empty section, and thus the reset operation may be completed. That is, when the reset operation is performed on one section included in the first section group 421a, data corresponding to the LAs in a corresponding section may be discarded in response thereto, the corresponding section may become the empty section immediately, and thus the reset operation may be completed. At this time, discarding the data corresponding to the LAs in the reset operation on the section may mean releasing a mapping relationship between the LA and the data. The reset operation may be performed when all data corresponding to the LAs in a specific section are invalid, and when valid data exists, the valid data may be mapped to an LA of another section, and data corresponding to the LA may be invalidated, and then the reset operation may be performed. The LAs included in the section of which reset is completed may be re-assigned to new data. The reset operation may be performed by the file system.

Figure 11:
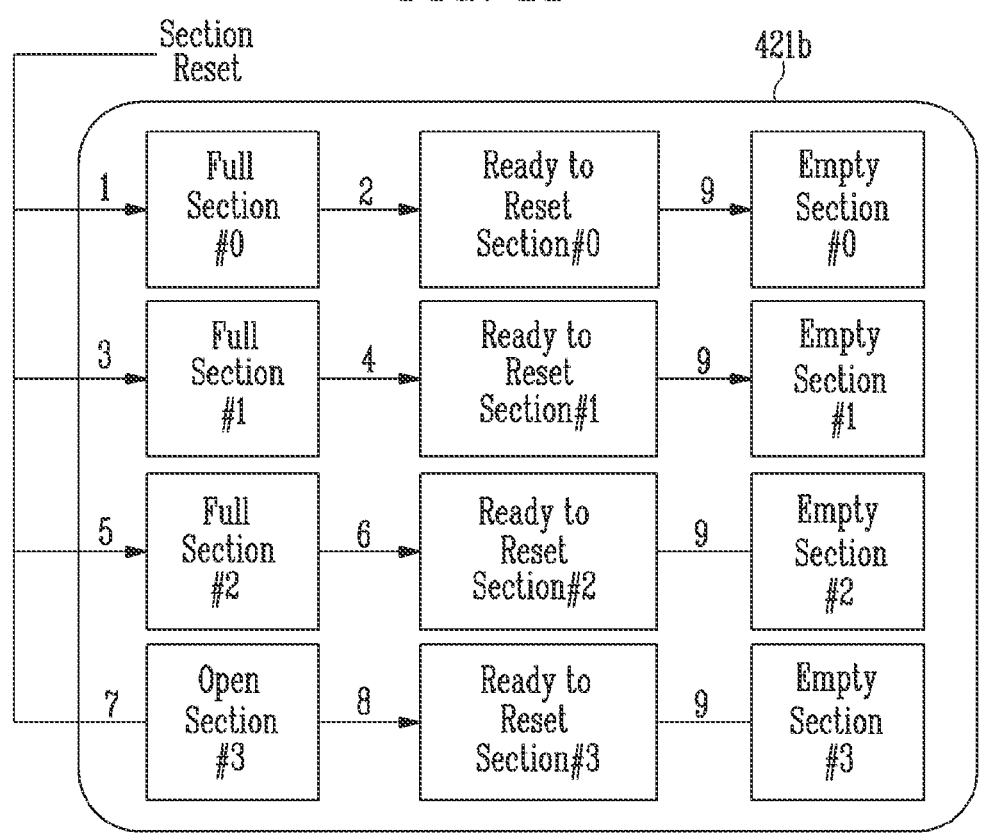
FIG. 11 is a diagram illustrating a reset process of the second section group by the file system according to an embodiment of the present disclosure.

FIG. 11 is a diagram illustrating a reset process of the second section group by the file system according to an embodiment of the present disclosure.

Referring to FIGS. 5 and 11, in the second section group 421b, 1) when resetting the 0-th section Section #0, 2) the data corresponding to the LAs in the 0-th section are not immediately discarded, information indicating that the 0-th section is in the ready-to-reset state (Ready to Reset Section) is stored in a bitmap. In addition, 3) when resetting the first section Section #1, 4) the data corresponding to the LAs in the first section are not immediately discarded, and information indicating that the first section is in the ready-to-reset state (Ready to Reset Section) is stored in the bitmap. In addition, 5) when resetting the second section Section #2, 6) the data corresponding to the LAs in the second section are not immediately discarded, and information indicating that the second section is in the ready-to-reset state (Ready to Reset Section) is stored in the bitmap. In addition, 7) when resetting the third section Section #3, 8) the data corresponding to the LAs in the third section are not immediately discarded, and information indicating that the third section is in the ready-to-reset state (Ready to Reset Section) is stored in the bitmap. 9) Accordingly, when the information indicating that all sections of the second section group 421b are ready to reset is stored in the bitmap, all data corresponding to all LAs in all sections may be discarded, all sections in the second section group 421b may become empty sections at once, and thus the reset operation may be completed. That is, in a case of the second section group 421b, when only some sections are reset, the data may not be immediately discarded and the section may not become the empty section, but all sections in the second section group 421b may become the empty sections simultaneously by discarding the data corresponding to the LAs of all sections included in the second section group 421b after the information indicating that all sections are in the ready-to-reset state is stored.

When the reset operation is completed, the information indicating that all sections in the second section group 421b are in the ready-to-reset state may be deleted. At this time, the bitmap storing the information indicating that all sections in the second section group 421b are in the ready-to-reset state may be included in an arbitrary position in the storage device. At this time, discarding the data corresponding to the LAs in the reset operation on the section may mean releasing the mapping relationship between the LA and the data. The reset operation may be performed when all data corresponding to the LAs in a specific section are invalid, and when valid data exists, the valid data may be mapped to an LA of another section, and data corresponding to the LA may be invalidated, and then the reset operation may be performed. The LAs included in the section of which reset is completed may be re-assigned to new data. The reset operation may be performed by the file system. That is, the reset operation of the second section corresponds to the reset operation of the small multi-die zone 112b in the second SB 111b of FIG. 5. That is, when the reset operation is performed on the second section 422b, the second section is in the ready-to-reset state, and thus the small multi-die zone 112b corresponding to the second section 422b is not immediately erased, and is switched to the ready-to-reset state. Later, when all second sections 422b in the section group 421b in which the second section 422b is included are switched to the ready-to-reset state, that is, when all small multi-die zones 112b in the second SB 111b in which the small multi-die zone 112b is included are switched to the ready-to-reset state, data corresponding to the LAs of all second sections 422b in the section group 421b are discarded, all sections in the second section group 421b become the empty section simultaneously, and all small multi-die zones 112b in the second SB 111b corresponding thereto are erased, and become the empty state.

Figure 12:
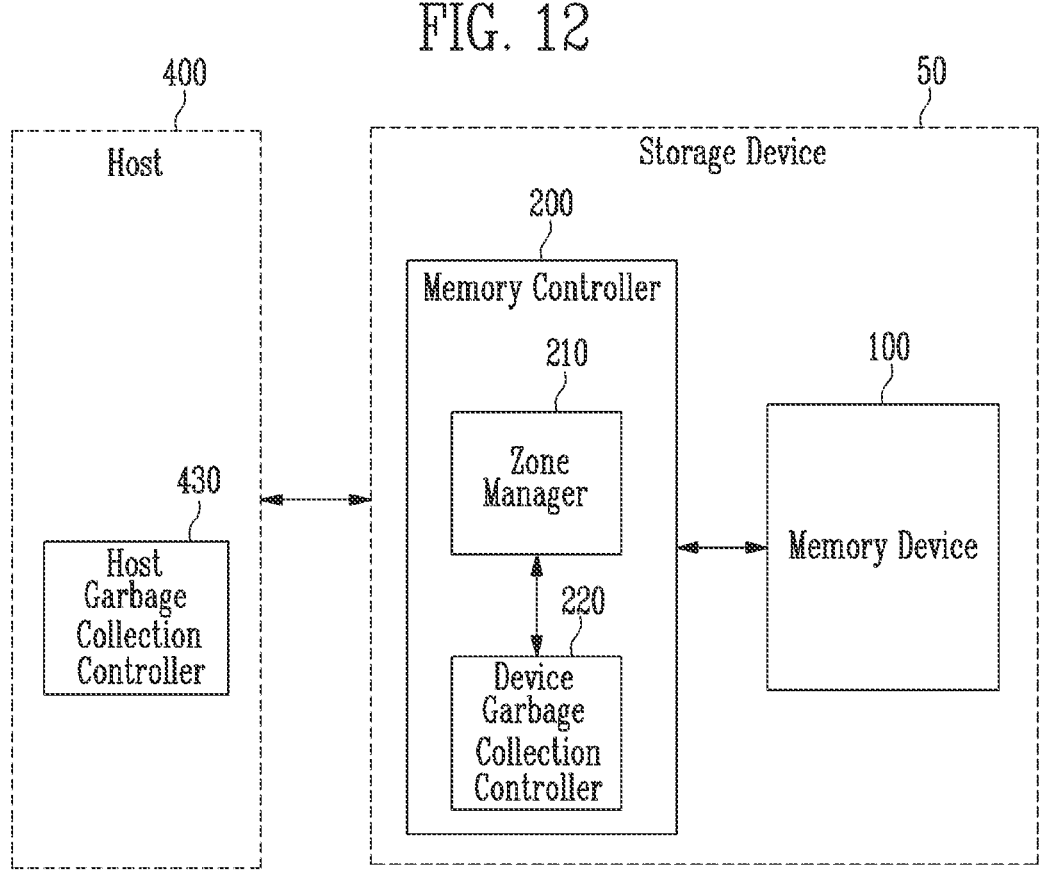
FIG. 12 is a diagram illustrating garbage collection in a storage device according to an embodiment of the present disclosure.

FIG. 12 is a diagram illustrating garbage collection in a storage device according to an embodiment of the present disclosure.

Referring to FIGS. 1, 4, and 12, the host 400 includes a host garbage collection controller 430. The host garbage collection controller 430 may be included in the file system 420, or may be included in the host 400 as a configuration separate from the file system 420. The host garbage collection controller 430 may include information on the section allocated by the file system 420 and the section group and information on the SB and the zones corresponding thereto. In addition, information on each of the pages included in the zones may be included. For example, information on validity or invalidity of data stored in each of the pages may be included.

The host garbage collection controller 430 may provide the garbage collection request to the storage device 50. The garbage collection request may include information on each of the pages included in the zones, and in an embodiment, the garbage collection request may include information on valid pages included in the small multi-die zone. In more detail, information on valid pages included in the small multi-die zones that are in the full state may be included, for example, the number of valid pages included in the small multi-die zones that are in the full state, and a predetermined number of valid pages. It may include a list of small multi-die zones each including valid pages of a predetermined number or more.

The memory controller 200 in the storage device 50 may include a zone manager 210 and a device garbage collection controller 220. The zone manager 210 may allocate and manage the zone and the SBs corresponding to the section and the section group allocated by the host. The small single-die zone 112a in the first SB 111a may be allocated and mapped in response to the first section 422a in the first section group 421a, and the small multi-die zone 112b in the second SB 111b may be allocated and mapped in response to the second section 422b in the second section group 421b. The device garbage collection controller 220 may perform garbage collection in response to the garbage collection request received by the storage device 50 from the host 400. The device garbage collection controller 220 may receive the information on the SB and the zones allocated from the zone manager 210, and select the victim SB based thereon. The victim SB may be selected from among the second SBs 111b including the small multi-die zones 112b. The device garbage collection controller 220 may select the victim SB from among the SBs including only the zones that are in the full state and the ready-to-reset state. The device garbage collection controller 220 may select the victim SB in consideration of the number of zones that are in the ready-to-reset state. The information on the number of zones that are in the ready-to-reset state may be received from the zone manager 210 or the host garbage collection controller 430. For example, as the number of zones that are in the ready-to-reset state increases, a probability the SB is selected as the victim SB may increase. In addition, the device garbage collection controller 220 may select the victim SB in consideration of information on valid pages included in the zones that are in the full state. The information on the valid pages included in the zones that are in the full state may be received from the host garbage collection controller 430, and such information may be received together with the garbage collection request. For example, as the number of valid pages included in the zones that are the full state increases, a probability that the SB is selected as the victim SB may increase. The zone manager 210 may not manage information on whether the pages included in the zone are valid and invalid, and thus information related thereto may be received from the host garbage collection controller 430. When the victim SB is selected by the device garbage collection controller 220, data stored in the zones that are in the full state in the victim SB may be copied and stored in another SB by the zone manager 210. When the victim SB is the second SB 111b including the small multi-die zones 112b, the other SB in which the data of the zone that is in the full state in the victim SB may also be copied and stored may be the second SB 111b. In addition, at this time, since the zone manager 210 may not manage the information on whether the pages included in the zone are valid or invalid, the data may be copied and stored in a zone unit. Alternatively, the data may be copied and stored in page unit based on the information on the valid pages received from the host garbage collection controller 430. That is, only the data stored in the valid pages among the zones of the full state included in the victim SB may be copied and stored in the other SB.

FIG. 13 is a flowchart illustrating a process of selecting a victim SB in a storage device according to an embodiment of the present disclosure.

Referring to FIGS. 12 and 13, in operation S1301, the storage device 50 may receive the garbage collection request from the host 400. In response to this, in operation S1303, the memory controller 200 may select candidate SBs. The candidate SBs may be the SBs including the plurality of small multi-die zones. In an embodiment, the SBs including only the small multi-die zones that are in the full state and the ready-to-reset state may be selected as the candidate SBs.

In operation S1305, a cost for the garbage collection for each of the candidate SBs may be calculated. At this time, the cost for the garbage collection may be calculated in consideration of the number of small multi-die zones that are in the ready-to-reset state in the SB. The cost may be calculated for each of the candidate SB according to a predetermined method, and in an embodiment, an SB having the lowest cost may be selected as the victim SB.

In operation S1307, the cost of each of the candidate SBs may be adjusted based on the number of the valid pages included in the small multi-die zone of the full state included in each of the candidate SBs. For example, as the number of valid pages included in the small multi-die zone of the full state increases, a weight may be given to reduce the cost, thereby increasing a probability in which it is selected as the victim SB may be increased. At this time, the information on the number of valid pages may be included in the garbage collection request. For example, the information on the valid pages may include the number of valid pages included in the small multi-die zones that are the full state and the list of the small multi-die zones each including the valid pages of a predetermined number or more.

First, it may be checked whether the zone included in the candidate SB does exist in the list of the small multi-die zones each including the valid pages of the predetermined number or more, and then when the zone does exist in the corresponding list, the weight may be given based on the number of valid pages to reduce the cost of the candidate SB.

In operation S1309, the cost of each of the candidate SBs adjusted and confirmed by operation S1307 may be compared. Accordingly, a candidate SB having the lowest cost may be selected as the victim SB in operation S1311.

FIG. 14 is a flowchart illustrating a process of performing garbage collection on a victim SB according to an embodiment of the present disclosure.

Referring to FIGS. 13 and 14, the data stored in the zones that are the full state in the victim SB selected by the process according to FIG. 13 may be copied in operation S1401 and stored in another SB. When the victim SB is the second SB including the small multi-die zones, the other SB to which the data is moved may also be the second SB. At this time, the data may be copied in the zone or page unit.

In operation S1403, erasure may be performed on the SB in which the data movement is completed. Accordingly, all zones included in the victim SB may be switched to the empty state.

FIG. 15 is a diagram illustrating the memory controller of FIG. 1 according to another embodiment of the present disclosure.

Referring to FIG. 15, the memory controller 1000 may include a processor 1010, an internal memory 1020, an error correction code circuit 1030, a host interface 1040, a buffer memory interface 1050, and a memory interface 1060.

The processor 1010 may perform various operations or may generate various commands for controlling the memory device 100. When receiving a request from the host 400, the processor 1010 may generate a command according to the received request and transmit the generated command to a queue controller (not shown). In addition, the processor 1010 may allocate the SB in the memory device in which the data received from the host is to be stored and the zone included therein, in response to the zone allocation request from the host 400, and manage the allocated SB and the zone. In addition, the processor 1010 may perform the garbage collection in response to the garbage collection request from the host 400.

The internal memory 1020 may store various pieces of information necessary for an operation of the memory controller 1000. For example, the internal memory 1020 may include logical and physical address map tables. The internal memory 1020 may be configured of at least one of a random access memory (RAM), a dynamic RAM (DRAM), a static RAM (SRAM), a cache, and a tightly coupled memory (TCM).

The error correction code circuit 1030 is configured to detect and correct an error of data received from the memory device 100 using an error correction code (ECC). The processor 1010 may adjust a read voltage according to an error detection result of the error correction code circuit 1030 and control the memory device 100 to perform re-reading. In an embodiment, an error correction block may be provided as a component of the memory controller 1000.

The host interface 1040 may exchange a command, an address, and data between the memory controller 1000 and the host 400. For example, the host interface 1040 may receive a request, an address, and data from the host 400, and may output data read from the memory device 100 to the host 400. The host Interface 1040 may communicate with the host 400 using communication standards or interfaces such as, universal serial bus (USB), serial AT attachment (SATA), serial attached SCSI (SAS), high speed interchip (HSIC), small computer system Interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), load reduced DIMM (LRDIMM), enhanced small disk interface (ESDI), or integrated drive electronics (IDE). The host interface 1040 may receive the request to allocate the zone corresponding to the section &located to data by the host 400. The host interface 1040 may receive the request to perform the garbage collection from the host 400, and at this time, the host interface 1040 may receive the information on the valid pages included in the small multi-die zone of the memory device 100 together.

The buffer memory interface 1050 may transmit data between the processor 1010 and the buffer memory. By the processor 1010, the buffer memory interface 1050 may use the buffer memory as a read buffer, a write buffer, a map buffer, and the like. According to an embodiment, the buffer memory may include a double data rate synchronous dynamic random access memory (DDR SDRAM), DDR4 SDRAM, low power double data rate4 (LPDDR4) SDRAM, graphics double data rate (GDDR) SDRAM, low power DDR (LPDDR), or Rambus dynamic random access memory (RDRAM). When the buffer memory is included in the memory controller 1000, the buffer memory interface 1050 may be omitted.

The memory interface 1060 may exchange the command, the address, and the data between the memory controller 1000 and the memory device 100. For example, the memory interface 1060 may transmit the command, the address, the data, and the like to the memory device 100 and may receive the data and the like from the memory device 100 through a channel. The memory interface 1060 may transmit and receive the command, the address, the data, and the like to and from the memory device 100 based on the SB and the zone allocated and managed by the processor 1010. In addition, when the garbage collection is performed, some data in the SB selected as the victim SB may be moved to another SB, and the erase operation may be performed on the victim SB.

Figure 16:
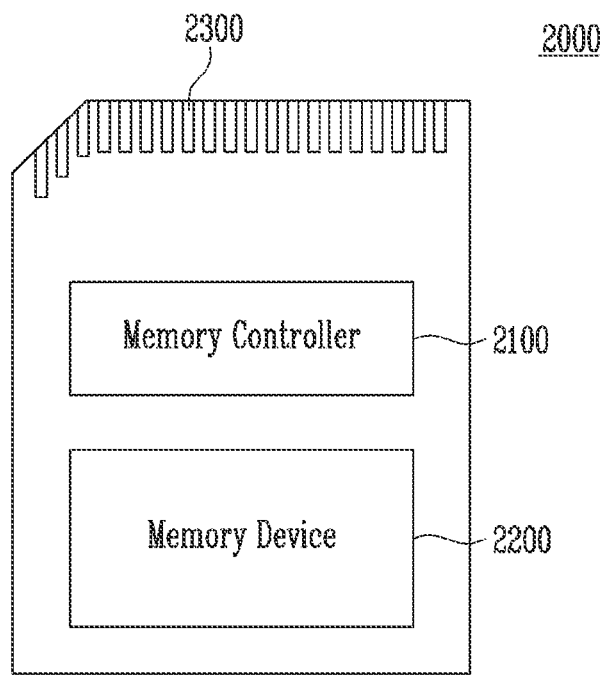
FIG. 16 is a block diagram illustrating a memory card system to which a storage device according to an embodiment of the present disclosure is applied.

FIG. 16 is a block diagram illustrating a memory card system to which a storage device according to an embodiment of the present disclosure is applied.

Referring to FIG. 16, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1. For example, the memory controller 2100 may allocate a zone and an SB including the same in the memory device 2200 to control the memory device 2200 in units of the zone and the SB.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 17:
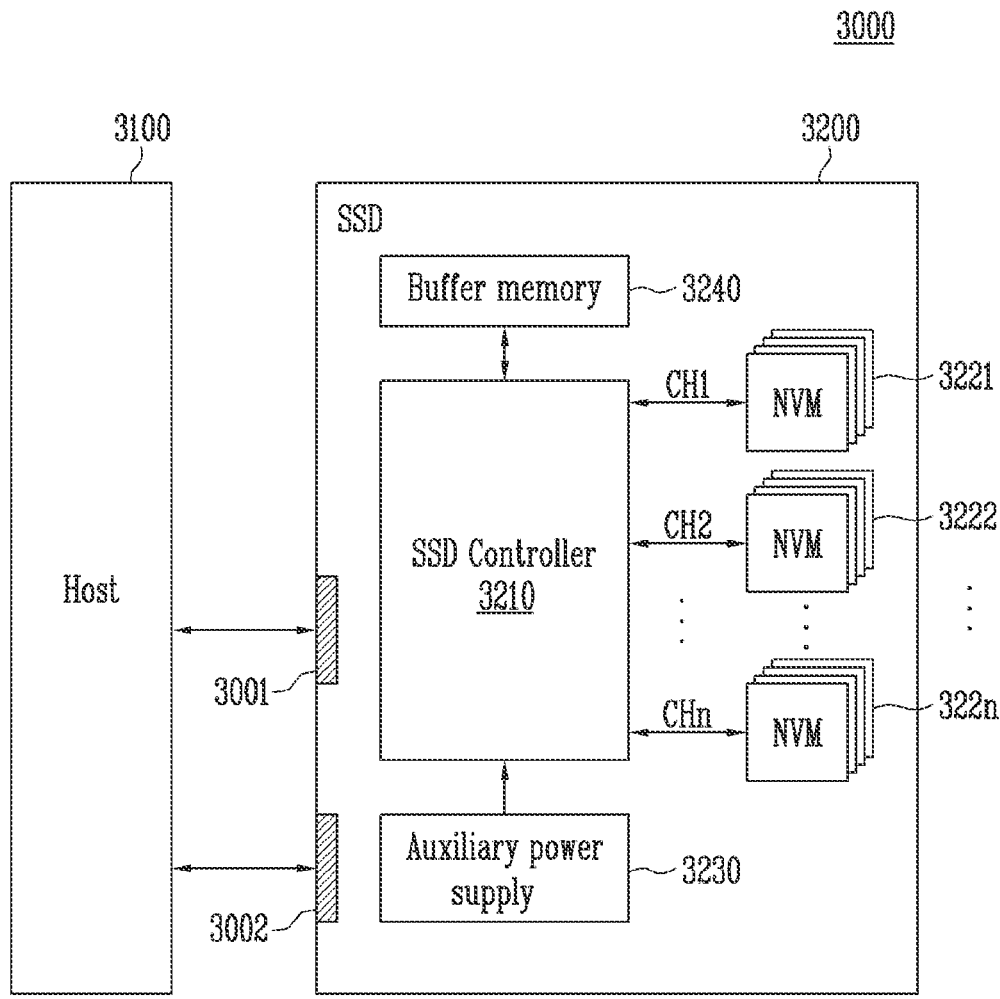
FIG. 17 is a block diagram illustrating a solid state drive (SSD) system to which a storage device according to an embodiment of the present disclosure is applied.

FIG. 17 is a block diagram illustrating a solid state drive (SSD) system to which a storage device according to an embodiment of the present disclosure is applied.

Referring to FIG. 17, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. The SSD controller 3210 may control the plurality of flash memories through a plurality of channels CH1 to CHn. One or more memory dies may be connected to each channel. For example, the signal may be signals based on an interface between the host 3100 and the SSD 3200. For example, the signal may be a signal defined by at least one of communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. The SSD controller 3210 may perform garbage collection according to a garbage collection request received from the host 3100.

The auxiliary power supply 3230 is connected to the host 3100 through the power connector 3002. The auxiliary power supply 3230 may receive the power from the host 3100 and may charge the power. The auxiliary power supply 3230 may provide power to the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-ARAM, and a PRAM.

Figure 18:
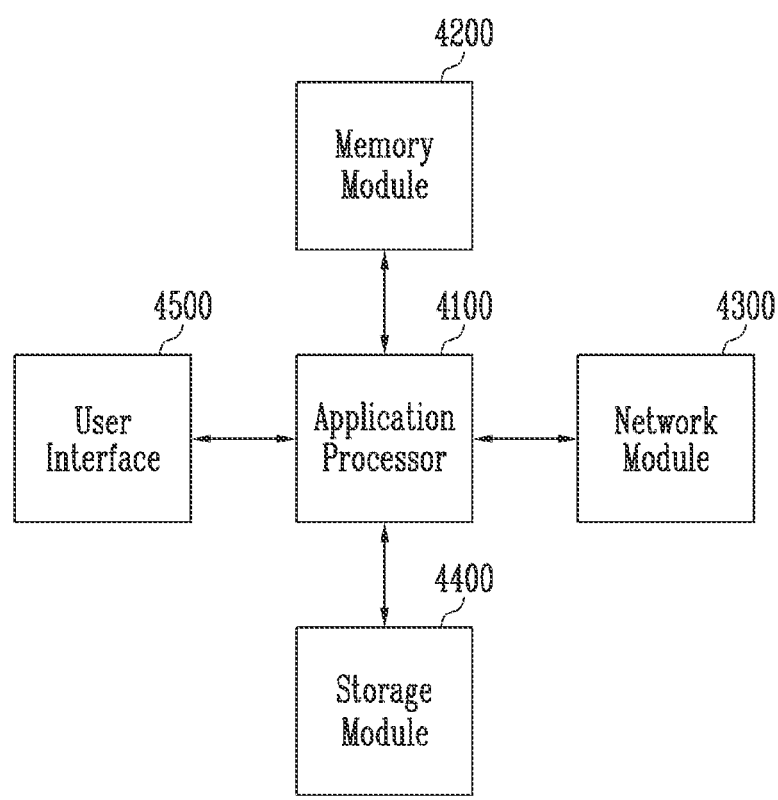
FIG. 18 is a block diagram illustrating a user system to which a storage device according to an embodiment of the present disclosure is applied.

FIG. 18 is a block diagram illustrating a user system to which a storage device according to an embodiment of the present disclosure is applied.

Referring to FIG. 18, the user system 4000 includes an application processor 4100, a memory module 4200, a network module 4300, a storage module 4400, and a user interface 4500.

The application processor 4100 may drive components, an operating system (OS), a user program, a file system, or the like included in the user system 4000. For example, the application processor 4100 may include controllers, interfaces, graphics engines, and the like that control the components included in the user system 4000. The application processor 4100 may be provided as a system-on-chip (SoC). The application processor 4100 may generate a log for data requested by a user to write, allocate a section group and a section based thereon, and provide the data to which the section is allocated to the storage module 4400.

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, WiMAX, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Although various embodiments have been described for illustrative purposes, it will be apparent to those skilled in the art that various changes and modifications may be made without departing from the spirit and scope of the invention as defined in the following claims. Furthermore, the embodiments may be combined to form additional embodiments.

What is claimed is:

1. A storage device comprising:
a memory device including a plurality of memory dies; and
a memory controller configured to control the memory device in units of super blocks each including two or more memory blocks included in the memory device,
wherein at least one of the super blocks within the memory device is a super block including a plurality of small multi-die zones each including a portion of each of the memory blocks included in different memory dies among the memory dies, and wherein the memory controller is further configured to receive a garbage collection request and information on valid pages included in the small multi-die zone, and to select, among the super blocks within the memory device, a victim super block in response to the garbage collection request, wherein the victim super block includes the plurality of small multi-die zones including one or more small multi-die zones having a ready-to-reset state in which a reset operation is performed on the victim super block to cause all small multi-die zones in the victim super block to be in an empty state by erasing the all small multi-die zones, and wherein the reset operation is not completed on the victim super block according to a state of another small multi-die zone in the victim super block.

2. The storage device of claim 1, wherein each of the small multi-die zones has one state among a full state in which an empty area does not exist in a corresponding zone, the empty state in which the corresponding zone is empty, an active state in which data is stored only in a partial area in the corresponding zone, and the ready-to-reset state in which the reset operation is performed on a super block including the corresponding zone to cause all small multi-die zones in the super block including the corresponding zone to be in the empty state by erasing the all small multi-die zones in the super block including the corresponding zone, and wherein the reset operation is not completed on the super block including the corresponding zone according to a state of another small multi-die zone in the super block including the corresponding zone.

3. The storage device of claim 2, wherein the memory controller selects, among the super blocks within the memory device, the victim super block from among super blocks formed of only the small multi-die zones that are in the full state and the ready-to-reset state.

4. The storage device of claim 3, wherein the information on the valid pages included in the small multi-die zone includes information on valid pages included in the small multi-die zone in the full state in each of the super blocks within the memory device.

5. The storage device of claim 4, wherein the memory controller selects the victim super block based on the information on the valid pages included in the small multi-die zone.

6. The storage device of claim 4, wherein the information on the valid pages included in the small multi-die zone that is in the full state includes a number of valid pages included in the small multi-die zone that is in the full state and a list of small multi-die zones each including a predetermined number of valid pages or more.

7. The storage device of claim 4, wherein the memory controller selects the victim super block based on a number of the small multi-die zones that are in the ready-to-reset state.

8. The storage device of claim 3, wherein the memory controller is further configured to copy data stored in the small multi-die zones that are in the full state in the victim super block, and store the data in another super block including a plurality of small multi-die zones.

9. The storage device of claim 2, wherein the memory controller is further configured to perform the reset operation on a selected super block including the plurality of small multi-die zones by:

switching states of all small multi-die zones in the selected super block to the ready-to-reset state, and erasing all switched small multi-die zones for the states of the all switched small multi-die zones to become the empty state.

10. The storage device of claim 1, wherein at least one of the super blocks within the memory device is a super block including a plurality of small single-die zones each including one or more memory blocks in one memory die.

11. A method of operating a storage device comprising a memory device including a plurality of memory dies and a memory controller controlling the memory device in units of super blocks each including two or more memory blocks included in the memory device, the method comprising:

receiving a garbage collection request and information on valid pages; and selecting, among the super blocks within the memory device, a victim super block based on the information on the valid pages, wherein at least one of the super blocks within the memory device is a super block including a plurality of small multi-die zones each including a portion of each of the memory blocks included in different memory dies among the memory dies, wherein the valid pages are included in the small multi-die zone, wherein the victim super block includes the plurality of small multi-die zones including one or more small multi-die zones having a ready-to-reset state in which a reset operation is performed on the victim super block to cause all small multi-die zones in the victim super block to be in an empty state by erasing the all small multi-die zones, and wherein the reset operation is not completed on the victim super block according to a state of another small multi-die zone in the victim super block.

12. The method of claim 11, wherein each of the small multi-die zones has one state among a full state in which an empty area does not exist in a corresponding zone, the empty state in which the corresponding zone is empty, an active state in which data is stored only in a partial area in the corresponding zone, and the ready-to-reset state in which the reset operation is performed on a super block including the corresponding zone to cause all small multi-die zones in the super block including the corresponding zone to be in the empty state by erasing the all small multi-die zones in the super block including the corresponding zone, wherein the reset operation is not completed on the super block including the corresponding zone according to a state of another small multi-die zone in the super block including the corresponding zone, and wherein the victim super block is selected from among super blocks formed of only the small multi-die zones that are in the full state and the ready-to-reset state among the super blocks within the memory device.

13. The method of claim 12, wherein the selecting of the victim super block comprises:

selecting, among the super blocks within the memory device, candidate super blocks each formed of only the small multi-die zones that are in the full state and the ready-to-reset state; and selecting, among the candidate super blocks, the victim super block based on a number of valid pages included in the small multi-die zone that is in the full state in each of the candidate super blocks.

14. The method of claim 13, wherein the information on the valid pages included in the small multi-die zone includes information related to the number of valid pages included in the small multi-die zone that is in the full state in each of the super blocks within the memory device.

15. The method of claim 13, wherein the selecting of the victim super block among the candidate super blocks comprises:
- calculating a cost based on a number of the small multi-die zones that are in the ready-to-reset state in each of the candidate super blocks;
- adjusting the cost based on the number of the valid pages included in the small multi-die zone of the full state in each of the candidate super blocks; and
- comparing the adjusted costs of the candidate super blocks.

16. The method of claim 13, further comprising:
- copying data stored in the small multi-die zones of the full state in the victim super block;
- storing the copied data in another super block; and
- erasing the victim super block.

17. The method of claim 16, wherein the another super block is a super block including the plurality of small multi-die zones.

18. The method of claim 11, wherein at least one of the super blocks within the memory device is a super block including a plurality of small single-die zones each including one or more memory blocks in one memory die.

* * * * *